(12) United States Patent
Feldman et al.

(10) Patent No.: US 7,773,143 B2
(45) Date of Patent: Aug. 10, 2010

(54) THIN COLOR CAMERA HAVING SUB-PIXEL RESOLUTION

(75) Inventors: Michael R. Feldman, Huntersville, NC (US); Robert Te Kolste, Charlotte, NC (US)

(73) Assignee: Tessera North America, Inc., Charlotte, NC (US)

(*) Notice: Subject to any disclaimer, the term of this patent is extended or adjusted under 35 U.S.C. 154(b) by 1190 days.

(21) Appl. No.: 10/949,807

(22) Filed: Sep. 27, 2004

(65) Prior Publication Data

US 2005/0225654 A1    Oct. 13, 2005

(51) Int. Cl.
*H04N 5/225* (2006.01)
*H04N 3/14* (2006.01)
*H04N 5/335* (2006.01)
*H04N 9/04* (2006.01)

(52) U.S. Cl. ...................................... 348/340; 348/272
(58) Field of Classification Search ................ 348/265, 348/266, 272, 277
See application file for complete search history.

(56) References Cited

U.S. PATENT DOCUMENTS

| | | | |
|---|---|---|---|
| 4,479,143 A | 10/1984 | Watanabe et al. | |
| 4,804,249 A | 2/1989 | Reynolds et al. | |
| 5,355,222 A | 10/1994 | Heller et al. | |
| 5,568,197 A | 10/1996 | Hamano | |
| 5,671,073 A | 9/1997 | Psaltis et al. | |
| 5,748,371 A | 5/1998 | Cathey, Jr. et al. | |
| 5,757,423 A | 5/1998 | Tanaka et al. | |
| 5,760,832 A | 6/1998 | Yamanaka et al. | |
| 6,069,738 A | 5/2000 | Cathey, Jr. et al. | |
| 6,108,036 A * | 8/2000 | Harada et al. ............. | 348/219.1 |
| 6,137,535 A | 10/2000 | Meyers | |
| 6,346,969 B1 | 2/2002 | Kwon | |
| 6,366,319 B1 | 4/2002 | Bills | |

(Continued)

FOREIGN PATENT DOCUMENTS

EP    1 215 729 A2    6/2002

(Continued)

OTHER PUBLICATIONS

Tanida, et al., "Color imaging with an integrated compound imaging system".

(Continued)

*Primary Examiner*—Kelly L Jerabek
(74) *Attorney, Agent, or Firm*—Lee & Morse, P.C.

(57) ABSTRACT

A color camera includes at least three sub-cameras, each sub-camera having an imaging lens, a color filter, and an array of detectors. The color camera combines images from the three sub-cameras to form a composite multi-color image, wherein the three sub-cameras include a total number of detectors N and a total number of different color sets X, wherein a first number of signals of a first color set is less than N/X and a second number of signals of a second color set is greater than N/X, signals of the second color set being output from at least two of the three sub-cameras, wherein resolution of a composite image of the second color set is greater than resolution of an individual sub-camera and a resolution of the composite image. Corresponding images of the same color set may be shifted, either sequentially or simultaneously, relative to one another.

34 Claims, 5 Drawing Sheets

U.S. PATENT DOCUMENTS

| | | | |
|---|---|---|---|
| 6,414,296 | B1 | 7/2002 | Edwards |
| 6,417,950 | B1 | 7/2002 | Cathey, Jr. et al. |
| 6,541,284 | B2 | 4/2003 | Lam |
| 6,611,289 | B1 | 8/2003 | Yu et al. |
| 6,632,701 | B2 | 10/2003 | Merrill |
| 6,882,364 | B1 | 4/2005 | Inuiya et al. |
| 7,003,177 | B1 | 2/2006 | Mendlovic et al. |
| 7,009,652 | B1 * | 3/2006 | Tanida et al. ............ 348/340 |
| 7,034,866 | B1 | 4/2006 | Colmenarez et al. |
| 2002/0089596 | A1 | 7/2002 | Suda |
| 2002/0122124 | A1 | 9/2002 | Suda |
| 2002/0163582 | A1 | 11/2002 | Gruber et al. |
| 2002/0181123 | A1 | 12/2002 | Han |
| 2002/0181126 | A1 | 12/2002 | Nishioka |
| 2005/0073603 | A1 | 4/2005 | Feldman et al. |
| 2005/0104991 | A1 | 5/2005 | Hoshino et al. |
| 2005/0128335 | A1 | 6/2005 | Kolehmainen et al. |
| 2005/0242410 | A1 | 11/2005 | Groot et al. |
| 2005/0248680 | A1 | 11/2005 | Humpston |
| 2005/0258350 | A1 | 11/2005 | Van Arendonk |
| 2006/0044450 | A1 | 3/2006 | Wolterink et al. |

FOREIGN PATENT DOCUMENTS

| | | | |
|---|---|---|---|
| WO | WO 01/99431 | A2 | 12/2001 |
| WO | WO 02/077695 | A1 | 10/2002 |
| WO | WO 03/024090 | | 3/2003 |
| WO | WO 2005/041561 | | 5/2005 |

OTHER PUBLICATIONS

Optics Express, 11(18):2109-2117 (Sep. 8, 2003).

Kubala, et al. Reducing Complexity in Computational Imaging Systems, Optical Society of America (© 2003).

Mait, et al., Evolutionary Paths in Imaging and Recent Trends, Optics Express, vol. 11, No. 18, pp. 2093-2101 (Sep. 8, 2003).

Potuluri, et al, High Depth of Field Microscopic Imaging Using An Inteferometric Camera, Optics Express, vol. 8, No. 11, pp. 624-630 (May 21, 2001).

Tanida, et al., Thin Observation Module by Bound Optics (TOMBO): Concept and Experimental Verification, Applied Optics, vol. 40, No. 11, pp. 1806-1813 (Apr. 10, 2001).

Dowski, Jr., et al., Aberration Invariant Optical/Digital Incoherent Optical Systems, Imaging Systems Laboratory, Dept. of Electrical Engineering, U. Colorado, Boulder CO, *Optical Review*, vol. 3, No. 6A, pp. 429-432 (1996).

Dowski, Jr., et al., Wavefront Coding: A Modern Method of Achieving High Performance and/or Low Cost Imaging Systems, (9 pages) *SPIE* (1999).

* cited by examiner

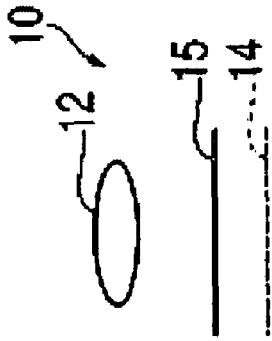

| R | G |
|---|---|
| G | B |

FIG. 2C

| R | G | G | R |
|---|---|---|---|
| G | B | B | G |
| B | G | G | B |
| G | R | R | G |

FIG. 2D

| G | R | G | B | B | R | G | G |
|---|---|---|---|---|---|---|---|
| B | G | R | G | G | G | B | R |
| R | B | G | G | R | G | B | G |
| G | G | R | B | B | G | R | G |
| B | G | R | G | R | B | B | G |
| G | R | G | B | G | G | G | R |

FIG. 3A
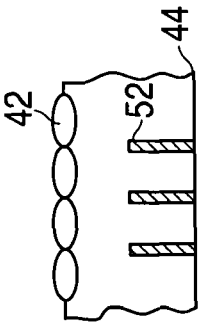
FIG. 3B
FIG. 4A
FIG. 4B
FIG. 4C
FIG. 4D
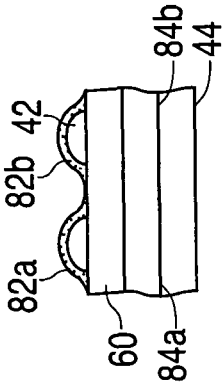
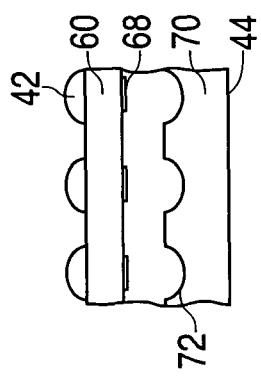
FIG. 5
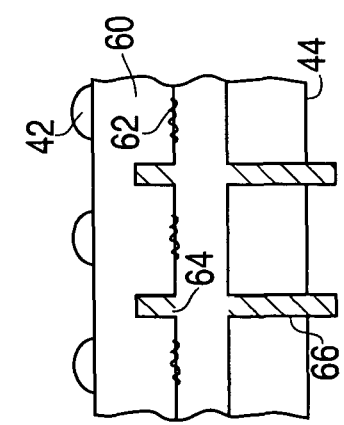
FIG. 6
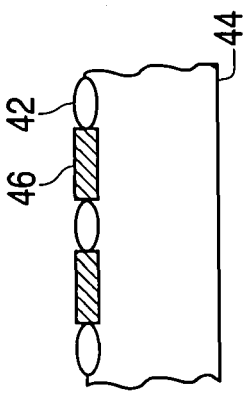
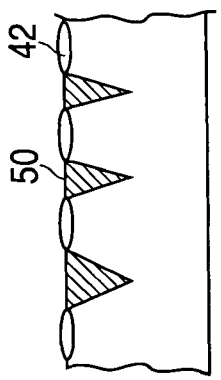

THIN COLOR CAMERA HAVING SUB-PIXEL RESOLUTION

BACKGROUND OF THE INVENTION

1. Field of the Invention

The present invention is directed to a thin camera. More particularly, the present invention is directed to a thin camera using color filters and/or having an increased field of view.

2. Description of Related Art

A conventional camera 10, shown in FIG. 1A includes a lens 12 with a focal length f and a detector array 14, having a plurality of pixels. To realize color imaging, an array of filters 15 having some pattern, typically with more green filters than red or blue filters, is provided. An example of the filter array 15 is shown in FIG. 1B. Each filter in the filter array 15 corresponds to a detector, or pixel, in the detector array 14. However, this camera is relatively thick.

In creating a thin color camera, one solution uses compound eye image capturing, the size of the lens being in accordance with a desired thinness of the camera. Each lens in the compound eye corresponds to a plurality of pixels, with the compound eye being selected so that spacing of the lenses is not an integral multiple of pixel spacing. Thus, each lens looks at different shifted images. The lenses used in the compound eye image capturing system generally have low resolution, for example a PSF equal or larger than the area of each pixel. A resolution greater than that of an individual sub-camera is achieved by combining the images from multiple cameras. For this solution, a color filter array 15' shown in FIG. 1C, has a color filter for each lens. Multiple lenses are used for each color and the images for each color combined. However, the use of compound eye image capturing is computationally intensive and it is difficult to achieve a resolution equal or close to that of the number of pixels in the sensor array for the entire composite image.

SUMMARY OF THE INVENTION

The present invention is therefore directed to a thin color camera, which substantially overcomes one or more of the problems due to the limitations and disadvantages of the related art.

Advantages and features of the present invention may be realized by providing a color camera, including at least three sub-cameras, each sub-camera having an imaging lens, a color filter, and an array of detectors. The images from the at least three sub-cameras are combined to form a composite multi-color image. The at least three sub-cameras include a total number of detectors N and a total number of different color sets X, wherein a first number of signals of a first color set is less than N/X and a second number of signals of a second color set is greater than N/X, signals of the second color set being output from at least two of the at least three sub-cameras, wherein resolution of a composite image of the second color set is greater than resolution of an individual sub-camera and a resolution of the composite image of the first color set is no greater than that of an individual sub-camera.

Filters associated with a color set may be substantially the same. A first image of the second color set output from a first sub-camera may be shifted relative to a second image of the second color set output from a second sub-camera. The first sub-camera may include means for shifting the first image. The means for shifting the first image may include an aperture between the imaging lens and the array of detectors. The means for shifting the first image may include means for offsetting a center of an imaging lens of the first sub-camera from an imaging lens of the second sub-camera by a non-integer amount of a detector size in the array of detectors. The means for shifting the first image may include means for offsetting along a first direction a center of an imaging lens of the first sub-camera from an imaging lens of the second sub-camera by a non-integer amount of a detector size in the array of detectors and an aperture between the imaging lens and the array of detectors blocking light along a second direction.

The color camera may include means for sequentially shifting images in the sub-cameras. The means for sequentially shifting may include a voltage controlled liquid lens.

Color filters associated with the color sets may be provided on top of each imaging lens. Each sub-camera may further include another color filter between the imaging lens and the detector array. The color camera may further include a blocking element between adjacent imaging lenses. The blocking element may be tapered to be wider near the imaging lenses and narrower towards the array of detectors. Each imaging lens may include a refractive element on a first surface of a substrate and another lens element on a second surface of the substrate. The another lens element may be a diffractive element. Each imaging lens may include a refractive element on a first surface of a first substrate and another lens element on a second surface of a second substrate. The first and second substrates may be secured together. The resolution of an image of the first color set may be substantially equal to a resolution of a sub-camera. The second color set may include green light or luminance information. Each sub-camera may be associated with one color set.

Advantages and features of the present invention may be realized by providing a color camera, including an electronically controllable lens, least three color sets, an imaging lens, a detector array receiving an image of the at least three color sets from the imaging lens; and a processor, the processor receiving electrical signals from the detector array, sequentially supplying a control signal applied to the electrically controllable lens to shift an image on the detector array, and forming a composite image from the electrical signals from the detector array.

The processor varies and sequentially may supply the control signal until a desired resolution of the composite image is realized. The second color set includes luminance information and the first color set may include chromatic information.

Advantages and features of the present invention may be realized by providing a color camera including at least three sub-cameras, each sub-camera having an imaging lens, a color filter, and an array of detectors. The color camera also combines images from the at least three sub-cameras to form a composite multi-color image, further including at least one different optical element in an optical path of a first detector relative to a corresponding second detector receiving substantially the same wavelength, thereby increasing a resolution of the composite multi-color image to be greater than that of an individual sub-camera.

The different optical element may be a mask used to block light in the first detector, wherein a shape of the mask for the first detector is different from a mask for the second detector, which may have no mask. The first and second sub-cameras may have substantially same color filters, with the first and second detectors are in the first and second sub-cameras, respectively. The color filters of the first and second sub-cameras may transmit substantially only green light or only luminance information. The first and second sub-cameras may be adjacent to one another.

Advantages and features of the present invention may be realized by providing a color camera including at least three sub-cameras, each sub-camera having an imaging lens, a color filter, and an array of detectors. The color camera combines images from the at least three sub-cameras to form a composite multi-color image, at least two of the at least three sub-cameras each generate an image for a substantially same color spectra, the at least two images for the substantially same color spectra having a variation therebetween to provide a resolution of a composite image for the substantially same color spectra which is higher than that of an individual sub-camera, a resolution of a color image not having the substantially same color spectra being less than the resolution of the composite image.

BRIEF DESCRIPTION OF THE DRAWINGS

The above and other features and advantages of the present invention will become readily apparent to those of skill in the art by describing in detail embodiments thereof with reference to the attached drawings, in which:

FIG. 1A is a schematic side view of an imaging system in a conventional camera;

FIG. 1B is a plan view of a conventional color filter array for use with the conventional camera of FIG. 1A;

FIG. 1C is a plan view of another conventional color filter array;

FIG. 2A is a is a schematic perspective view of an imaging system in a camera according to an embodiment of the present invention;

FIG. 2B is a plan view of a color filter according to an embodiment of the present invention;

FIG. 2C is a plan view of another color filter according to another embodiment of the present invention;

FIG. 2D is a plan view of still another color filter according to still another embodiment of the present invention;

FIGS. 3A and 3B are plan views of further color filters according to other embodiments of the present invention;

FIGS. 4A-4D are schematic side views of different blocking elements in the system according to the present invention;

FIG. 5 is a schematic side view of an embodiment of the present invention including a mask adjacent to the lenses;

FIG. 6 is a schematic side view of still another embodiment of the present invention.

DETAILED DESCRIPTION OF THE INVENTION

Figure 7A:
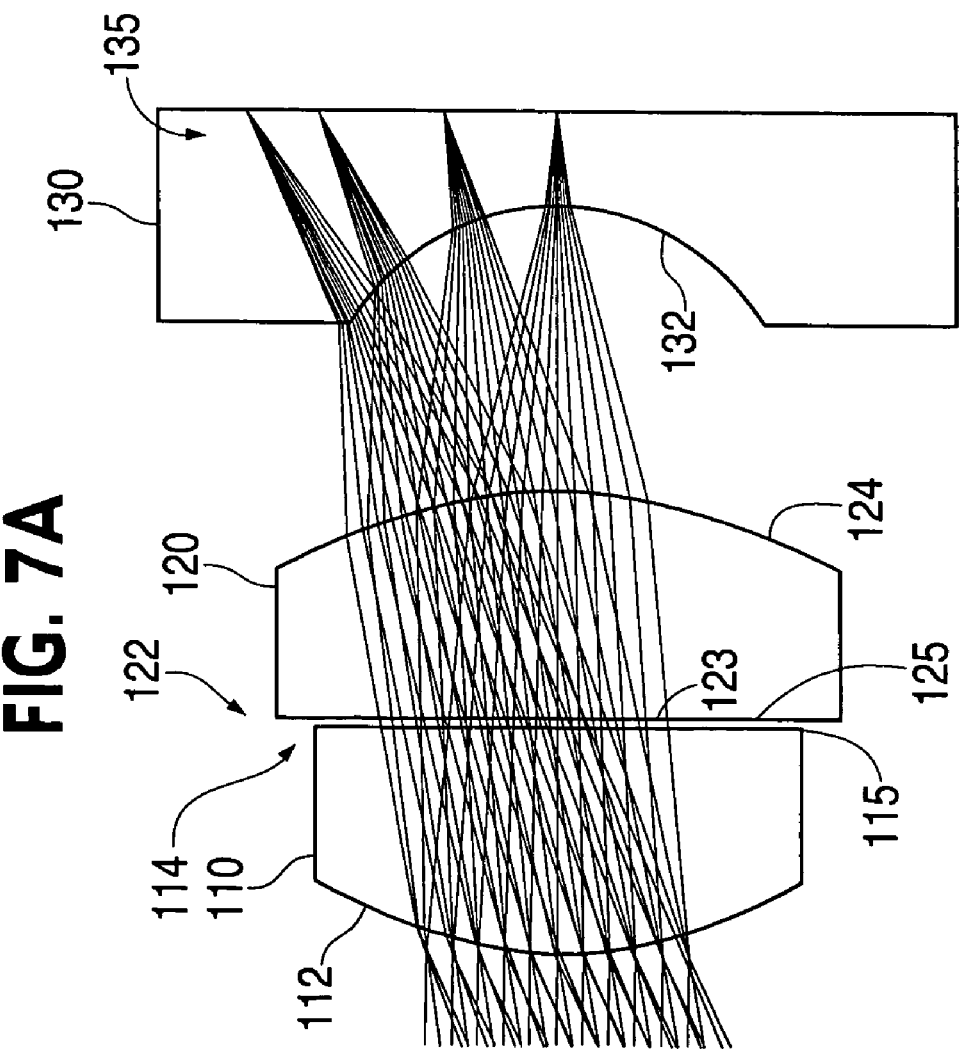
FIG. 7A is a schematic side view of a specific lens system for use with the present invention.

U.S. Provisional Application Ser. Nos. 60/560,273, filed on Apr. 8, 2004, entitled "Thin Camera," and 60/608,378 filed on Sep. 13, 2004, entitled "Thin Color Camera," are incorporated herein by reference in their entirety for all purposes.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the concept of the invention to those skilled in the art. In the drawings, the thickness of layers and regions are exaggerated for clarity. It will also be understood that when a layer is referred to as being "on" another layer or substrate, it may be directly on the other layer or substrate, or intervening layers may also be present. Further, it will be understood that when a layer is referred to as being "under" another layer, it may be directly under, or one or more intervening layers may also be present. In addition, it will also be understood that when a layer is referred to as being "between" two layers, it may be the only layer between the two layers, or one or more intervening layers may also be present. Like numbers refer to like elements throughout.

A useful parameter in imaging systems is the f/# of the system, where f/#=f/D, where f is the focal length and D is the size of the aperture of the lens. In creating a thinner camera, while keeping the same f/# as for a conventional camera, when f is reduced, a commensurate reduction in D is needed.

The general structure of a thin camera in accordance with an embodiment of the present invention is shown in FIG. 2A. A thin camera 20 includes an imaging lens array (ILA) 22, a color filter 25 and a detector array 24. The detector array 24 may be the same is in the conventional camera, and may include a microlens array, with a microlens corresponding to each pixel to improve the fill factor. As shown in the particular example of FIG. 2A, when the focal length of the conventional single lens is halved, D is also halved and the F# is maintained. In order to maintain the same field of view as in a conventional camera, a 2×2 array of lenses 22a-22d can be used with each lens addressing a quarter of the area of the sensor plane. Each combination of a lens 22a-22d, a color filter 25a-25d and corresponding portion of the detector array 24 constitutes a sub-camera. Thus, for the embodiment shown in FIG. 2A, there are a total of four sub-cameras. The images from each of the four sub-cameras are provided to a processor 30 where they are combined in a known manner to form a composite color image. The color filter 25 may be placed anywhere between the front of the camera and the sensor plane.

Here, rather than being driven only by thinness, the number of lenses or sub-cameras in the array is driven by a combination of several factors. First, the more lenses used, in general, the thinner the camera. However, it is a feature of an embodiment of the present invention is to achieve a resolution in the composite image equal or comparable to the total number of pixels in the image sensor without a great deal of computational signal processing. In order to achieve this, the point spread function (PSF) of the optics is preferably smaller than the pitch of the pixels on the sensor. The more lenses used, the more difficult recovery the full resolution of the sensor becomes. For example, if the sensor contains one million pixels, then the resolution of the image from each sub-camera is 250,000 pixels, assuming a tow by two ILA is used. However, it is a feature of an embodiment of this invention to produce a composite image with a resolution of or near one million, which means increasing the resolution by roughly a factor of four. For the two by two ILA, the size of the lens and the corresponding thickness of the sub-camera is half that of a conventional single lens camera, while being much more computationally straightforward than for a compound eye camera. Finally, a solid optical path may be provided between the ILA and detector, i.e., no air gaps therebetween. This focusing inside a material having a refractive index higher than air also the diffraction limited spot size from each lens of the ILA to be reduced.

Exemplary embodiments of the color filter 25 to be used are shown in FIGS. 2B-2D. The color filter 25 may have a different color filter 25a through 25d corresponding to each lens 22a through 22d, as shown in FIG. 2B. In particular, filter 25a may transmit red (R) light, filters 25b and 25c may transmit green (G) light, and filter 25d may transmit blue (B) light. Since each lens captures the entire image, a composite image can be realized by combining the images from each sub-camera. The composite image will have higher resolution that that of the individual sub-cameras. For example, in a conventional one megapixel, i.e. one million pixels, camera, there are 250,000 blue pixels, 250,000 red pixels and 500,000 green pixels. Each pixel samples light from a different portion of the image. Yet one million full color pixels are generated, typically by interpolation. If each image on each camera is identical, then there would be 250,000 red pixels of information, 250,000 blue pixels and 500,000 green pixels, 250,000 for each green sub-camera. So, there would be the same number of independent samples of information as in the conventional one megapixel camera for red and blue, but less for green, since the two green sub-cameras would be identical.

In one embodiment of the invention, the two green cameras may be distinguished from one another by placing apertures near the detector plane. By placing the apertures in different locations within the pixel, the two green sub-cameras will sample different portions of the image and thus generate 500,000 samples of information, rather than 250,000. There are several other ways to achieve this increase in information as well. Any method that will allow a different set of samples in the two green cameras achieves this increase. Other techniques include generating an image on the sensor plane for one green camera that is shifted slightly with respect to the other green camera, and using a combination of apertures and image shifting.

If apertures are to be used, one method of achieving this is to use the natural light blocking layers inherent in typical CMOS image sensors. CMOS image sensors typically have embedded circuitry that blocks a significant portion of the light incident on each pixel. For example, 25%-70% of the area of each pixel is typically blocked by this circuitry. In conventional cameras, micro-lens arrays (MLAs) are typically used to increase the efficiency of light capture by each pixel. In the conventional approach, the pitch of the lenses in the MLA is equal to the pitch of the pixels on the CMOS sensor chip, i.e., there is one micro-lens for each pixel. This approach typically improves the light capture efficiency of each pixel to approximately 75-85%. In accordance with an embodiment of the present invention, one way to achieve the light blocking apertures is to simply use the CMOS sensor chips without the micro-lenses, in the sub-cameras containing the green filters. As long as the two green images do not have identical registrations with respect to the pixels, the two green cameras will sample the image in different locations, i.e., different data will be generated by the two green cameras. If the two green camera images do have identical registrations with respect to the pixels, then circuit design can be modified on the image sensor chip so that the circuitry is blocking the light in different regions in the first green sub camera than in the second green sub camera.

In addition to using layers integrated on to the CMOS chip to block portions of the light, special MLAs can be used to shift the portions of the image that is detected by each pixel. For example the MLAs can be designed so that each micro-lens is slightly off-center of the active area of each pixel. In this manner a slightly different portion of the image is focused on to the active area of the sensor for the two green cameras.

Note that the MLAs can provide one shift for one camera and a different one for another camera. Or alternatively, each micro-lens within a sub-camera can provide a slightly different shift for every pixel, ensuring that the majority of the corresponding green pixels in the two green sub cameras receive different signals, for all ranges of object distance within the desired object distance range.

So the net result, is that four sub-cameras are used, i.e., one sub-camera is red, 1 sub-camera is blue and the other two sub cameras are green. When the composite image is formed, the red and blue resolution in the composite image is therefore the same as in the sub camera. However, the resolution for the composite image for the green color is increased over that of an individual camera, since information from the two individual cameras is combined to form a higher resolution composite image.

As mentioned above, there is no need to increase the resolution for the red and blue sub-cameras. Nevertheless, it may still be advantageous in some cases to use apertures and/or image shifting as described above for green, for the red and blue cameras, to, for example, sample the images in slightly different locations for the red and blue sub-cameras.

Since each lens captures the whole image, these color images may then be combined for full color with twice the resolution of a conventional color filter/pixel arrangement, i.e., simply using a Bayer pattern.

Alternatively, as shown in FIG. 2C, each lens 22a-22d may be assigned a different patterned color filter 25aa through 25dd, each lens being associated with a 4×4 color filter array. Since the position of the R and B filters are in different quadrants of the 4×4 array, and each lens captures the entire image, the color image may be realized. Again, there are twice as many G filters, here occupying each quadrant twice.

As another alternative, shown in FIG. 2D, a conventional color filter R-G-B color filter pattern can be used in which each pixel has a color filter associated therewith. In this case, if each camera captures identical images on the sensor plane, then the locations of the R, G and B filters need to be in different locations, for each camera. In any of the embodiments set forth in FIGS. 2B-2D, a quarter of the pixels generate N/4 sampling points of red, a quarter of the pixels generate N/4 samples of blue in the image and half of the pixels generate the N/2 samples of green. Any of the methods described above can be used to ensure that the N/2 samples of green are substantially independent.

In the above embodiments, there are still four cameras. In the first embodiment, each sub-camera images only one color. In the other two embodiments, there are multiple color filters for each sub-camera. However, in all the embodiments, for each pixel in the composite image, there are four corresponding pixel samples, one blue, one red and two green. In all of these approaches, each of these pixel samples originates from a different sub-camera. In the first approach all of the red pixels originate from one sub-camera. In the other approaches, the red pixel information is obtained from different sub-cameras for different pixels. One advantage of providing multiple colors for each sub-camera arises when the imaging range is relatively close to the camera, but target range of object distances is fairly large. Depending on the distance of the object from the camera, there will be a slightly different shift of the images on the sensors. There may be some locations of the image where the signals for both of the green cameras are nearly identical for certain regions. If this is the case then obtaining the green images from more cameras can improve the resolution of the image.

Any of the filters of FIGS. 2B-2D may be combined with a mask for a pixel disclosed in either commonly pending U.S.

application Ser. No. 10/784,782, filed Feb. 24, 2004, and entitled "FOCAL PLANE CODING FOR DIGITAL IMAGING" or U.S. application Ser. No. 10/763,396, filed Jan. 26, 2004, and entitled "THIN CAMERA HAVING SUB-PIXEL RESOLUTION," both of which are incorporated herein by reference in their entirety for all purposes. By combining the color filter of the present invention, half of the sub-pixels needed to increase the resolution of the above applications.

Other alternatives for realizing color images are shown in FIGS. 3A and 3B. Assuming four lenses are used, a filter 35 would include regions 35a through 35d. In the embodiment shown in FIG. 3A, at least two colors are provided on each pixel region. Region 35a transmits all light, i.e., has no filter, region 35b transmits red and green, region 35c transmits blue and green, and region 35d transmits red and blue. Region 35d may be eliminated, due to the green dominance realized by the other regions. If all four regions are used, then to determine the value of red simply subtract the power from a pixel in region 35c, from the corresponding pixel in region 35a. Similarly, the values for the other colors can also be obtained. Thus, only three lenses and associated filters are needed to realize full color, while maintaining green dominance. This also increases the amount of light incident on the detector plane. For example, using a conventional filter, 25% of red light, 25% of blue light and 50% of green light is transmitted. With the three filters noted above, approximately 67% of red light, 67% of blue light and 100% of green light is transmitted. If the same amount of power is to be incident on each detector, then some of the light in the most transmissive filter may be blocked to provide the shifting as noted above, while allowing the detectors to have the same gain.

Another alternate embodiment uses a color filter 37 shown in FIG. 3B, which uses the format established by the Joint Photographic Experts Group (JPEG). Again assuming four lenses are used, the filter 37 would include regions 37a through 37d. As shown in FIG. 3B, two of the regions 35a, 35d have a Y filter, region 35b has a R filter and region 35c has a B filter. In accordance with the JPEG standard, the YUV filters transmit in accordance with the following equation (1):

$$Y=0.299R+0.58G+0.114B$$

$$U=B-Y$$

$$V=R-Y \quad (1)$$

Thus, the YUV components may be determined from the filter 37 shown in FIG. 3B. The signal transmitted by the Y filter serves as the luminance. If more of the light needs to be transmitted, the proportions of the light transmitted by the Y filter could remain the same, while passing about all of the green light, about 0.51 of the red light, and about 0.2 of the blue light, with the remaining filters staying the same.

Typically, JPEG encoding has a higher number of Y samples. This fact may be used to improve the resolution of the camera. For example, by providing different information on the different Y regions, resolution can be improved. Such different information may be provided by blocking some of the light, shifting the image, or a combination thereof. If the point spread function (PSF) of the ILA is smaller than the pixel size, by focusing the light for one of the Y regions onto metal or other opaque material in the plane of the detector array to block some of the light will result in a differences between the images of the two Y regions. This may also be achieved by eliminating the microlens associated with each pixel to receive the altered image. To realize a shifted image, appropriate lenses in the ILA or microlenses for the detectors may be offset, i.e. to be off-axis. Thus, the resolution of the composite image will be determined by that of the Y image, with the other color images having a lower resolution. Again, since the Y filter allows more power through than the other filters, light can be blocked for this filter while equalizing power on the array of detectors.

The same approach may be used with the green filters for the red, blue, green configuration. Further, the shifting and/or blocking may be used in both Y regions. Additionally, the blocking may be realized using the apertures noted above. Finally, relative shifting of the blue and red images to each other may be used to improve the resolution of these images.

Increasing the number of lenslets in the ILA means that crosstalk becomes more of an issue. A light blocking element between the lenses themselves or between the lenses and the detector plane isolating light from the respective lenses may be used to minimize this crosstalk, as shown in FIGS. 4A-4D. Such a blocking element may be opaque or absorptive. These blocking elements may be in addition to or in place of conventional stops within the system. While keeping the same detector size, the lens size may be reduced to maintain the f/#, and the space between the lenses may include a blocking element as shown in FIGS. 4A, 4B and 4D. The use of smaller lenses with a low fill factor (e.g. sum of the area of the clear apertures of all the lenses less than 70% of the area of the sensor), in addition to reducing the focal length and maintaining the f/# of the system can be used to decrease cross talk, increase the field of view. While the fill factor of the lens array is then less than 100%, the detectors will still have a 100% fill factor.

As shown in FIG. 4A, blocking elements 46 are placed between lenses 42 of the ILA over a detector array 44. This allows smaller lenses to be used with the same detector array 44. It is noted that in the detector array 44, sensing regions are not continuous, i.e., there is a dead space between sensing regions. The blocking elements 46 prevent stray light from impinging on the detector array 44.

As shown in FIG. 4B, tapered blocking elements 50 are between adjacent lenses 42 and between the lenses 42 and the detector plane 44. These tapered blocking elements 50 may extend to the detector plane 44 to block as much crosstalk as possible, without unnecessarily blocking wanted light.

As shown in FIG. 4C, even when the lenses 42 are not spaced apart, blocking devices 52, here having a high aspect ratio and being close to the detector plane 44, may be used to reduce crosstalk. This is particularly useful for blocking off-axis illumination.

As shown in FIG. 4D, the lenses 42 may be only one element in an optical system for imaging onto the detector plane 44. For example, the lenses 42 may be formed on a substrate 60, with other optical elements 64, e.g., diffractive or refractive optical elements, on an opposite surface of the substrate 60. Additionally or alternatively, further substrates containing optical elements may be provided. Further, the blocking element may include a first blocking portion 64 and a second blocking portion 66. Here, the first blocking portion 64 is closer to the lenses 42 than to the detector plane 44 and is thicker than the second blocking portion 66, which is closer to the detector plane 44. In this fashion, a tapered structure different from than in FIG. 4B may be used to minimize crosstalk.

In addition to or instead of having another optical element on the opposite surface of the substrate 60, a mask 68, as discussed above, may be provided on this surface, as shown in FIG. 5. The alignment of the lenses 42 and the mask 62 may be readily realized, since they are on the same substrate 60. An additional substrate 70 including further optical elements 72 for imaging onto the detector plane 44 may be used. Here, since the mask is not between the optical elements 72 and the detector plane 44, the optical elements 72 may be of poor quality, e.g., having aberrations, while collecting all the light. The alignment of the mask 68 relative to the lenses 42 on the same substrate 60 is much more readily achieved than aligning the mask 68 to the detector plane 44. Further, this reduces the alignment requirements between the lenses 42 and the detector plane 44.

Another example of an embodiment that reduces cross talk is shown in FIG. 6. Here, lenses 42 of the ILA are covered with a color filter 82 corresponding to a color filter 84 between the ILA and the detector plane 44. In other words, the individual filters 82a, 82b of the color filter 82 match the individual color filters 84a, 84b of the color filter 84. By filtering the colors both at the input to the sub-camera and between the ILA and the detector plane 44, assuming adjacent filters transmit different colors, cross-talk is reduced. The color filter 82 does not have to be on top of the lenses 42, but may be beneath them, as long as it serves to block light entering one lens of the ILA from entering the path of another lens of the ILA. Further, the color filter 84 may be directly on the detector, either before or after the MLA.

Figure 7B:
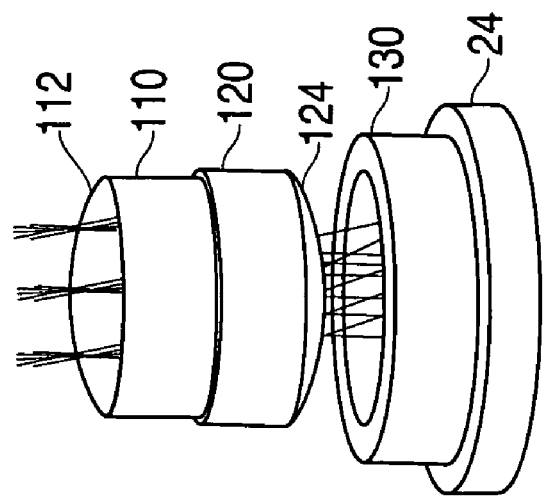
FIG. 7B is a schematic perspective view of the lens system of FIG. 7A.

A specific example of a lens of the ILA to be used with the present invention is shown in FIGS. 7A and 7B. In FIGS. 7A and 7B, the different light paths correspond to different field points from the object. A first substrate 110 has a first refractive surface 112 which collimates the light input thereto. A second surface 114 of the first substrate may be planar and may include an infrared filter 115 thereon. A first surface 122 of a second substrate 120 may have a diffractive element 123 thereon, which corrects for color and imaging aberrations. If each sub-camera has a single color filer, a single diffractive element 123 may be used for each sub-camera. A second surface 124 may have a second refractive surface for focuses the light. A third substrate 130 has a refractive, concave surface 132 therein. The concave surface 132 flattens the field of the image, so that all image points are focused at the same plane 135 to be imaged onto the detector array 24.

In the above embodiments, to improve the resolution, the imaging of the two green sub-cameras should receive different images. If the object is located at infinity, the zero frequency pixel will be located at the center of each lens. Thus, to achieve the desired image shifts, the lenses in the ILA may be shifted relative to one another by an integer number of pixels plus ½ a pixel. In other words. The center to center spacing P between adjacent lenses in the ILA would be given by:

$$P=(N+\tfrac{1}{2})*x \quad (2)$$

where x is the pixel pitch and N is an integer. For example, if each lens in the ILA has a diameter of 1 mm, x is 10 microns and N is selected to be 150, then the center to center spacing P is 1.505 mm.

If the object is not located at infinity, then an image pixel located under the center of one of the lenses will not be located under the center of an adjacent lens. Instead, it will be shifted by an amount s, given by:

$$s=P*di/do \quad (3)$$

where di is the image distance, approximately equal to the focal length of the lens for most applications, i.e., when R=do/di is greater than 10, and do is the object distance. When the focal length is 2 mm and assuming the pixel pitch x of 10 microns, the image shift s remains less than one tenth of a pixel for an object distance from infinity to approximately 3 m away. However, if the pixel pitch x is reduced to 3 microns, then when the object distance is 3, then s will be one-third of ⅓ of a pixel.

Although the images are located in different relative locations on the sub-camera pixels, depending upon the object distance, there is not an issue in terms of combining the wrong pixels when the composite image is generated. A relatively simple image processing algorithm can be used to determine the amount of shift needed to generate correlated images from different sub-cameras. However, at object locations where the image shift is closer to an integer number of pixels, instead of an integer plus ½, such interpolation becomes a problem, since such a shift would result in little or no difference between the images.

Figure 8A:
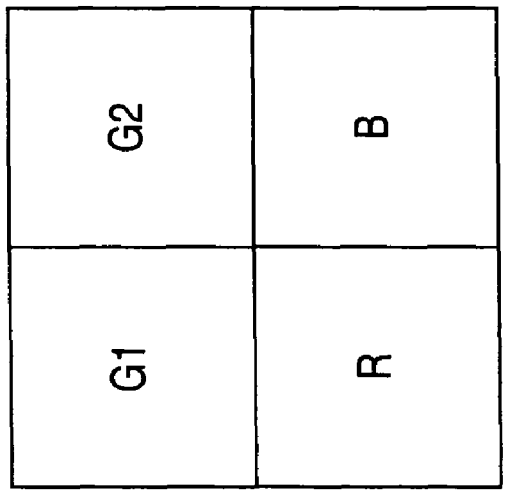
FIG. 8A is a schematic top view of a sub-camera arrangement according to an embodiment of the present invention.
Figure 8B:
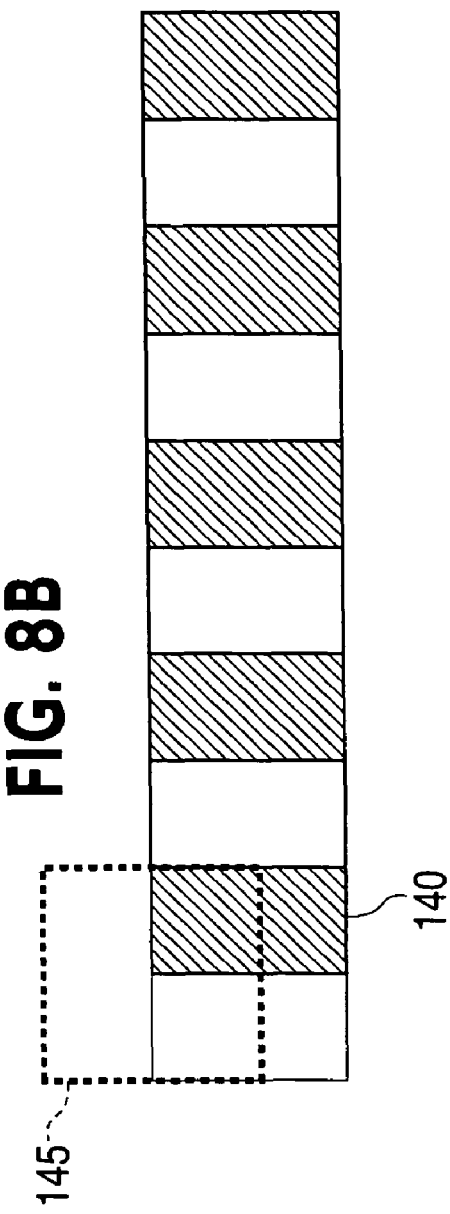
FIG. 8B is a schematic top view of shifted images for a sub-camera of FIG. 8A.

If a wide range of object distances is needed, one way to ensure different images from cameras with the same or similar color filters is to provide different optical elements in the paths thereof. For example, apertures, i.e., light blocking regions in the detector plane, maybe used. For example, one method to ensure different signals on the two green sub-cameras G1 and G2 is shown in FIG. 8B. In this embodiment, the G1 sub-camera has no apertures. Thus, the MLA for the G1 camera focuses nearly all the light in the sensor plane incident on a sensor pixel onto the active area of a pixel. On the G2 camera, a portion of the light on each pixel is blocked. In the example shown in FIG. 8B, the light on the left half of each pixel is blocked with an aperture 140. In addition, the lens centers of the two G1 and G2 cameras are placed very close to each other in the y-direction. That is the center co-ordinates of the centers of the lenses in the y-direction are offset by a small amount, e.g., by 0.5 pixels, or 1.5 microns for x=3 microns. Since the y-offset is so small, the shift in the image locations in the y-direction will be very small over a very wide range of object distances. For example if the y-offset is ⅓ of a pixel, then from equation (3), as long as R>4, then the shift s will change by less than 1/12 of a pixel, from R=4 to R=infinity. Thus a shift of a known fraction of a pixel in the y-direction can be maintained for a wide range of object distances, ensuring that the two green cameras sample the image at different y locations. This will ensure an ability to use the two green camera images to increase the resolution in the y-direction. This resultant shift is indicated by a pixel 145 in the G2 camera in FIG. 8B.

To also increase the resolution in the x-direction, apertures are used on the G2 camera, blocking light directed on to the left side of each pixel in the G2 camera. As the object distance changes, the relative shift in the x-direction of the images on the two sub-cameras will change. Using apertures on one sub-camera, but not on the other sub-camera, or using different shaped apertures on the two sub-cameras, increased resolution in the x-direction can be achieved for any shift in the x-direction, as long as the relative shift is determined. For example, if the signals on the two cameras are aligned, then by subtracting the signal on the G2 camera from that of the G1 camera, one can determine the signal on the left side of each pixel, since the G2 signal itself returns the average value of the right half of each pixel. If the image shifts by ½ of a pixel, then the G2 signal will return the left half of each pixel and subtraction will yield the right half of each pixel. If the image shifts by ¼ of a pixel, then the G2 signal returns a signal at the midway point between the samples of the G1 signals. If the image shifts by ¾ of a pixel then the centers of the G1 and G2 signals are aligned in the x-direction. However, by subtracting the corresponding G1 and G2 pixels and using interpolation algorithms, again increased resolution can be achieved. For example, for the ith pixel, if the G1 signal is subtracted from the G2 signal, the result is the sum of the left ¼ pixel and right ¼ pixel. By approximating the left ¼ pixel value to be the same as the previous pixel's right ¼ pixel value, or a weighted average sum of its closest neighboring samples, then the right ¼ pixel value can be determined.

This embodiment ensures that each pixel in the G1 and G2 sub-cameras will be centered at different locations in both the x and y directions. For example, if there are N/4 pixels in the G1 sub-camera and N/4 pixels for the G2 sub-camera, there will by N/2 unique green images. Lenses for red and blue cameras R, B, may be offset along y-direction for the example in FIG. 8A. The above problem of different object distances resulting in integer multiple of pixel shifts may arise. However, since in general higher resolution is more apparent in green than in red or blue, such decrease in resolution may not be of concern. If it is, then aperture could similarly be employed in either the red or blue sub-camera. Further, the above solution is also applicable when using Y, U, V sub-cameras, discussed above in connection with FIG. 3B.

Figure 9:
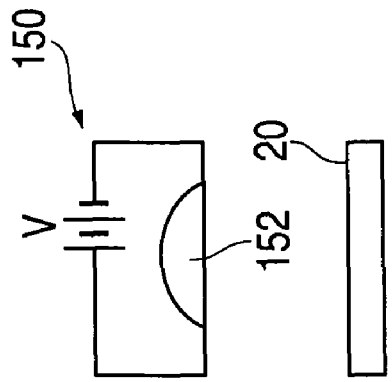
FIG. 9 is a schematic side view of a liquid lens used with a camera of the present invention.

Another solution for ensuring different images involves using a liquid lens 150 for the entire camera 20, as shown in FIG. 9. The liquid lens 150 includes a transparent, electrically conductive liquid 152 that may be tuned by applying a voltage V thereto. By using a weak liquid lens, i.e., one with a small amount of focusing power, the liquid lens may be used to fine tune the focus of the camera. As the focus of the liquid lens 150 changes, the combined focus of the camera 20 would also change, thereby serving as an auto-focus. Since the lenses of the sub-cameras of the camera 20 are offset from the center of the liquid lens, small changes in the liquid lens focus will shift the position of the image on the sensor array. Thus, if an object distance occurs for which two sub-cameras are generating the same image, a voltage may be applied to shift the locations of the images.

Additionally or alternatively, much higher resolution can be achieved by using the liquid lens to generate multiple signals from each pixel of a sub-camera. For example, after the initial image is sampled, a voltage can be applied to the liquid lens 150 to shift the image by ¼ of a pixel. Then the image can be sampled again. This shift and sampling can be repeated to generate a desired number of samples for each sensor. For example, four samples may be realized by further shifting by ½ pixel and ¾ pixel. The liquid lens 150 may also be used in this latter manner with a single sub-camera using a Bayer filter pattern, with the center of the liquid lens offset in one or both directions relative to the sub-camera. Thus, the shifting used to realize increased resolution may be performed sequentially, rather than simultaneously.

Embodiments of the present invention have been disclosed herein and, although specific terms are employed, they are used and are to be interpreted in a generic and descriptive sense only and not for purpose of limitation. For example, while the conventional three color components red, green and blue or YUV have been used throughout, any appropriate three color components for realizing full color imaging may be employed. Further, while circular lenses have been illustrated for the ILA, other shapes allowing higher packing densities for a higher fill factor, such as hexagonal lenses, may be used. Additionally, while different apertures have been described for providing different images in the sub-cameras having the same color, other optical elements that provide a difference may be used. For example, the active areas of the pixels themselves may be shaped differently for the different sub-cameras. Accordingly, it will be understood by those of ordinary skill in the art that various changes in form and details may be made without departing from the spirit and scope of the present invention as set forth in the following claims.

What is claimed is:

1. A color camera, comprising:
   at least three sub-cameras, each sub-camera including
      an imaging lens,
      a color filter, and
      an array of detectors;
   a combiner configured to combine images from the at least three sub-cameras to form a composite multi-color image, wherein the at least three sub-cameras include a total number of detectors N and a total number of different color sets X, wherein a first number of signals of a first color set is less than or equal to N/X and a second number of signals of a second color set is greater than N/X; and
   a differentiating element in a first sub-camera associated with the second color set to generate altered samples of the second color set from signals being output from a second sub-camera associated with the second color set, wherein resolution of a composite image of the second color set is greater than resolution of an individual sub-camera and a resolution of the composite image of the first color set is no greater than that of an individual sub-camera.

2. The color camera as claimed in claim 1, wherein filters associated with a color set are substantially the same.

3. The color camera as claimed in claim 1, wherein the differentiating element shifts a first image of the second color set output from the first sub-camera relative to a second image of the second color set output from the second sub-camera.

4. The color camera as claimed in claim 1, wherein the differentiating element includes an aperture between the imaging lens and the array of detectors in the first sub-camera.

5. The color camera as claimed in claim 1, wherein the differentiating element includes an imaging lens of the first sub-camera offset from an imaging lens of the second sub-camera by a non-integer amount of a detector size in the array of detectors.

6. The color camera as claimed in claim 5, wherein the offset is along a first direction and the differentiating element includes an aperture between the imaging lens and the array of detectors blocking light along a second direction in the first sub-camera.

7. The color camera as claimed in claim 1, wherein the differentiating element sequentially shifts a first image of the second color set output from the first sub-camera relative to a second image of the second color set output from the second sub-camera.

8. The color camera as claimed in claim 7, wherein the differentiating element includes a voltage controlled liquid lens.

9. The color camera as claimed in claim 1, wherein color filters associated with the color sets are provided on top of each imaging lens.

10. The color camera as claimed in claim 9, wherein each sub-camera further comprises another color filter between the imaging lens and the detector array.

11. The color camera as claimed in claim 1, further comprising a blocking element between adjacent imaging lenses.

12. The color camera as claimed in claim 11, wherein the blocking element is tapered to be wider near the imaging lenses and narrower towards the array of detectors.

13. The color camera as claimed in claim 1, wherein each imaging lens includes a refractive element on a first surface of a substrate and another lens element on a second surface of the substrate.

14. The color camera as claimed in claim 13, wherein the another lens element is a diffractive element.

15. The color camera as claimed in claim 1, wherein each imaging lens includes a refractive element on a first surface of a first substrate and another lens element on a second surface of a second substrate.

16. The color camera as claimed in claim 15, wherein the another lens element is a diffractive element.

17. The color camera as claimed in claim 15, wherein the first and second substrates are secured together.

18. The color camera as claimed in claim 1, wherein the resolution of an image of the first color set is substantially equal to a resolution of a sub-camera.

19. The color camera as claimed in claim 1, wherein the second color set includes green light.

20. The color camera as claimed in claim 1, wherein the second color set includes luminance information.

21. The color camera as claimed in claim 1, wherein each sub-camera is associated with one color set.

22. The color camera as claimed in claim 21, wherein each color set includes a filter transmitting one of R, G, and B light.

23. The color camera as claimed in claim 21, wherein each color set includes a filter transmitting at least two of R, G, and B light.

24. The color camera as claimed in claim 21, wherein each color set includes a filter transmitting one of Y, R, and B light.

25. A color camera, comprising:
   at least three sub-cameras, each sub-camera including
   an imaging lens,
   a color filter, and
   an array of detectors; and
   a combiner configured to combine images from the at least three sub-cameras to form a composite multi-color image, further including at least one differentiating optical element in an optical path of a first detector relative to a corresponding second detector receiving substantially the same wavelength, the at least one differentiating optical element providing an altered sample to the first detector relative to the second detector, thereby increasing a resolution of the composite multi-color image to be greater than that of an individual sub-camera.

26. The color camera as claimed in claim 25, wherein the different optical element is a mask used to block light in the first detector, wherein a shape of the mask for the first detector is different from a mask for the second detector.

27. The color camera as claimed in claim 26, wherein there is no mask for the second detector.

28. The color camera as claimed in claim 25, wherein the first and second sub-cameras have substantially same color filters, and the first and second detectors are in the first and second sub-cameras, respectively.

29. The color camera as claimed in claim 28, where the color filters of the first and second sub-cameras transmit substantially only green light.

30. The color camera as claimed in claim 28, where the color filters of the first and second sub-cameras transmit substantially only luminance information.

31. The color camera as claimed in claim 28, wherein first and second sub-cameras are adjacent to one another.

32. The color camera as claimed in claim 25, wherein the color filters are provided on top of each imaging lens.

33. The color camera as claimed in claim 32, wherein each sub-camera further comprises another color filter between the imaging lens and the detector array.

34. The color camera as claimed in claim 25, wherein the color filter within each sub-camera has substantially identical transmission.

* * * * *